United States Patent [19]

Katsuragawa

[11] Patent Number: 5,112,701
[45] Date of Patent: May 12, 1992

[54] MAGNETO-OPTIC RECORDING MEDIA AND PROCESS FOR PRODUCING THE SAME

[75] Inventor: Tadao Katsuragawa, Yamato, Japan
[73] Assignee: Ricoh Company, Ltd., Tokyo, Japan
[21] Appl. No.: 328,059
[22] Filed: Mar. 23, 1989

[30] Foreign Application Priority Data

| | | | |
|---|---|---|---|
| Mar. 25, 1988 | [JP] | Japan | 63-71057 |
| Jul. 27, 1988 | [JP] | Japan | 63-187386 |
| Aug. 5, 1988 | [JP] | Japan | 63-196295 |
| Aug. 8, 1988 | [JP] | Japan | 63-197521 |
| Nov. 7, 1988 | [JP] | Japan | 63-281991 |

[51] Int. Cl.$^5$ ............................................. G11B 5/66
[52] U.S. Cl. ................................ 428/694; 428/900; 369/13
[58] Field of Search ................... 428/694, 900; 369/13

[56] References Cited

U.S. PATENT DOCUMENTS

4,271,232  6/1981  Heiman et al. ................... 360/135

*Primary Examiner*—Merrell C. Cashion, Jr.
*Assistant Examiner*—Robert J. Follett
*Attorney, Agent, or Firm*—Cooper & Dunham

[57] ABSTRACT

Magneto-optic recording media and production processes of the same in which a thin magnetic film comprising, as the main ingredient, nitrides of metal (Fe, Co and Ni) and having strong perpendicular magnetic anisotropy is formed directly or indirectly by way of a reflective layer on a non-magnetic support, providing that the reflective layer is formed on the thin magnetic film if the magnetic thin film is disposed directly on the non-magnetic support.

8 Claims, 1 Drawing Sheet

MAGNETO-OPTIC RECORDING MEDIA AND PROCESS FOR PRODUCING THE SAME

BACKGROUND OF THE INVENTION

The present invention relates to magneto-optic recording media for recording and reproducing under the irradiation of light and a process for producing the recording media. Particularly, the present invention relates to magneto-optic recording media comprising thin magnetic metal nitride films having perpendicular magnetic anisotropy and showing a large Faraday rotational angle and a process for producing such media.

Thin magnetic films formed on appropriate substrates (non-magnetic substrates) have been utilized as recording media (such as magnetic recording media and magneto-optic recording media). For recording media, particularly, those employed in magneto-optic recording systems (hereinafter simply referred to as magnetic-optic recording media), it has been required that they have high recording sensitivity, large magneto-optic effect (Faraday effect, Kerr effect, etc.), capability of providing large area media element with homogenous composition at a low cost, as well as excellent stability. In addition, since the magneto-optic effect becomes the greatest when the direction of the magnetization is in parallel with the propagating direction of light and the magnetization perpendicular to the plane can also satisfy the requirement for the perpendicular magnetic recording, it is also suitable to high density recording. Accordingly, those materials having magnetization perpendicular to the plane surface of medium have to be selected.

In view of such requirements, as the magnetic materials for the magneto-optic recording media, there have been used:

(1) magnetic materials employed in perpendicular magnetic recording media (typically, magnet plumbite type Ba ferrite of hexagonal close-packed (hcp) structure), or
(2) MnBi, MnCuBi, MnGaGe, MnAlGe, PtCo (: polycrystalline), $(YBi)_3(FeGa)_5O_{12}$ (: single crystal), GdCo, GdFe, TbFe, GdTbFe, TbDyFe (: amorphous), etc.

However, the Ba ferrite magnetic material (1) mentioned above has a drawback that the film formation is difficult since it requires to conduct the film formation under low substrate temperature and no large magneto-optic effect can be obtained at the wavelength region of semiconductor lasers (for example, 780 nm, 830 nm, etc.). Although there has been attempted to increase the Faraday effect by substituting trivalent iron ions with bivalent Co and tetravalent Ti, the temperature for the film formation is high in this case and remarkable restriction is imposed on the selection of the substrate material. Similar tendency is also found in other oxide thin magnetic films, for example, thin garnet films.

On the other hand, magneto-optic recording media using polycrystallize materials in (2) mentioned above involve the problem of light scattering noise by the grain boundaries and can not obtain high S/N ratio. As compared with such polycrystalline materials, those magneto-optic recording media using amorphous materials in (2) mentioned above show no such disadvantages and have been used predominantly as magneto-optic recording materials, but they involve a drawback of instability being oxidized easily.

As a result of development for those magnetic materials of excellent stability, particularly, with no oxidation in view of various disadvantages described above, iron nitrides have been noted recently. Since iron nitrides are free from rusting and ferromagnetic and, in addition, have magnetic anisotropy in the direction perpendicular to the surface of a substrate, it has been proposed to apply them as magnetic materials of high density magnetic recording media, for example, of large capacity memory devices for use in recording tapes, video tapes, computers, etc. (Japanese Patent Application Laid-Open (KOKAI) No. 55-33093, No. 59-28705, No. 60-76021, No. 61-110328, No. 62-103821, etc.).

However, such proposals for magnetic nitride materials have been made only to perpendicular magnetic recording media mainly taking notice of the perpendicular magnetic anisotropy thereof, but applications to magneto-optic recording media have not been tried yet.

Although magnetic material comprising $\epsilon$-phase iron nitride $Fe_xN$ ($x=2-3$) is disclosed in Japanese Patent Application Laid-Open (KOKAI) No. 61-20078, the $Fe_xN$ is a magnetic powder and for forming the magnetic layer on a support, it has to be coated by using a binder, etc. Accordingly, the sensitivity of the magnetic layer tends to be lowered to provide only insufficient recording with light or heats of semi-conductor lasers, etc. and their uses are limited only to a case of practicing the thermal transfer between a master tape (Hi-Hc) and a copy tape (low-Hc), for example, in the dubbing of tapes.

Also, although magnetic recording media having a magnetic layer mainly comprising amorphous iron nitride $Fe_{1-x}N_x$ ($x \geq 0.4$) are disclosed in Japanese Patent Application Laid-Open (KOKAI) No. 60-25204, the magnetic layer comprises an amorphous iron nitride, the amorphous iron nitride contains much nitrogen ingredient as: $x \geq 0.4$, and the magnetic layer is not polycrystalline thin film.

Further, a production process for iron nitride magnetic material is disclosed in Japanese Patent Application Laid-Open (KOKAI) No. 62-232101, and it also discloses the C-axis orientation and perpendicular magnetic anisotropy. However, iron nitride disclosed therein has magnetic field with perpendicular magnetic anisotropy as low as about 1 KOe as shown in FIG. 3 thereof.

The present inventors have made studies from various aspects on the iron nitride magnetic materials and, as a result, it has been found that a thin magnetic film with excellent C-axis orientation having a large magnetic field with perpendicular magnetic anisotropy ($H_A \geq 4$ KOe) and a Faraday rotational angle ($\theta_F$) of not less than 0.3 deg/$\mu$m can be obtained by forming Fe nitrides films on a non-magnetic support using various film forming methods, particularly, ion beam sputtering, particularly, that the light permeability and the Faraday rotational angle can be improved by the improvement for the C-axis orientation, which is suitable to magneto-optic recording media, and further that such thin magnetic films can also be formed with other iron series element (Co, Ni) and also in nitrides containing two or more of Fe, Ni, Co. The present invention has been accomplished based on such findings.

SUMMARY OF THE INVENTION

An object of the present invention is to provide magneto-optic recording media capable of high density recording and reproducing, as well as a process for producing the same.

Another object of the present invention is to provide magneto-optic recording media, particularly, those improved with the reproducing efficiency due to Faraday effect and a process for producing the same.

An object of the present invention is to provide magneto-optic recording media comprising a C-axis oriented thin magnetic film comprising, as the main ingredient, nitrides of at least one metal selected from Fe, Co and Ni represented by the general formula $M_xN$ wherein x is 2–3 and M represents at least one metal selected from Fe, Co and Ni, and having Faraday rotational angle of not less than 0.3 deg/$\mu$m and magnetic field with perpendicular magnetic anisotropy of not less than 4 KOe, a reflective layer and a non-magnetic support, the C-axis oriented thin magnetic film being formed directly or through the reflective layer on the non-magnetic support, providing that the reflective layer is formed on the thin magnetic film when the thin magnetic film is disposed directly on the non-magnetic support.

In the magneto-optic recording media, a thin amorphous rare earth-transition element alloy film may be formed, instead of the reflective layer, between the thin magnetic film and the non-magnetic support.

In the magneto-optic recording media, the thin magnetic film containing metal oxides of at least one of Fe, Co and Ni is preferred. In this case, the amount of the metal oxide in the thin magnetic film is preferably not more than about 20% by weight.

In the magneto-optic recording media, the thin magnetic film containing metal fluorides of at least one of Fe, Co and Ni is also preferred. In this case, the amount of the metal fluoride in the thin magnetic film is preferably not more than about 40% by weight.

In the magneto-optic recording media, the thin magnetic film containing amorphous metals of at least one of Fe, Co and Ni is also preferred. In this case, the amount of the amorphous metal in the thin magnetic film is preferably not more than about 40% by weight.

Further, in the magneto-optic recording media, the thin magnetic film containing Fe, Co, Ni, Nitrogen, carbon and oxygen in the following ratio is also preferred.

50 atomic % $\leq$ Fe, Co and/or Ni $\leq$ 80 atomic %
10 atomic % $\leq$ N $\leq$ 40 atomic %
2 atomic % $\leq$ C $\leq$ 45 atomic %
2 atomic % $\leq$ O $\leq$ 25 atomic %

An another object of the present invention is to provide a process for producing magneto-optic recording media comprising reacting metal atoms of at least one selected from Fe, Co and Ni with nitrogen atoms under a magnetic field and depositing on a non-magnetic support, a reflection layer or a thin amorphous rare earth-transition element alloy film, to form a thin magnetic film comprising, as the main ingredient, metal nitrides represented by the formula: $M_xN$ (x=2–3).

In the process for producing the magneto-optic recording media, fluorine atoms may be reacted together with the nitrogen atoms under the magnetic field to incorporate metal fluorides into the thin magnetic film.

For the production process for the magneto-optic recording media, it is also preferred to make nitrogen into plasma and to collide against a target comprising metal atoms of at least one selected from Fe, Co and Ni, alloys thereof, nitrides and/or fluorides thereof.

In the process for producing the magneto-optic recording media, it is also preferred to use argon made into plasma together with nitrogen in the form of plasma.

In the process for producing the magneto-optic recording media, it is also preferred to react carbon atoms and oxygen atoms together with nitrogen atom with the metal atoms (Fe, Ni, Co) under the magnetic field to incorporate carbon and oxygen into the thin magnetic film.

In the process for producing the magneto-optic recording media, it is also preferred to make nitrogen, carbon and oxygen into plasma and to collide against a target comprising metal atoms of at least one selected from Fe, Co and Ni, alloys thereof, nitrides and/or fluorides thereof, to incorporate carbon and oxygen into the thin magnetic films. In this case, it is preferred to use argon made into plasma together with nitrogen, carbon and oxygen in the form of plasma.

In the process for producing the magneto-optic recording media, it is preferred that the magnetic field mainly comprises magnetic fluxes directed in perpendicular to the surface of the support by means of a magnet disposed at the back of the non-magnetic support.

According to the magneto-optic recording media of the present invention, since the light perpeability thereof is high and the Faraday effect thereof is great, satisfactory recording and reproducing are possible.

Further objects and advantages of the present invention will be apparent from the following description of the preferred embodiments of the invention as illustrated in the accompanying drawings.

DESCRIPTION OF THE PREFERRED EMBODIMENTS

Figure 1:
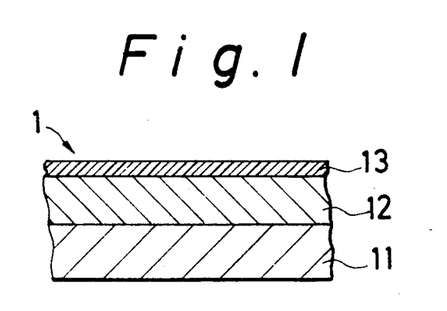
FIG. 1 is a cross sectional view illustrating a magneto-optic recording medium of one embodiment according to the present invention.
Figure 2:
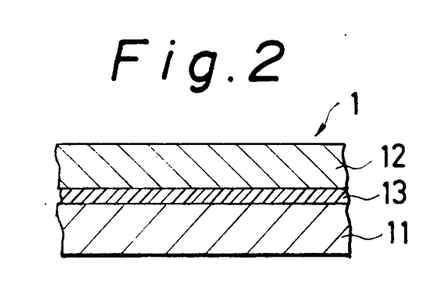
FIG. 2 is a cross sectional view illustrating a magneto-optic recording medium of another embodiment according to the present invention.

A magneto-optic recording medium of the type illustrated in FIG. 1 is adapted to be irradiated with laser beams for recording and producing from the side of a non-magnetic support 11. Accordingly, the non-magnetic support 11 used herein should be light transparent. On the other hand, the magneto-optic recording medium of a type illustrated in FIG. 2 is adapted to be irradiated with laser beams for recording and reproducing from the side of a thin magnetic film 12. Accordingly, the non-magnetic support 11 herein may be light transparent or not.

In these magneto-optic recording media, a protective layer or a lubricating layer as a surface layer may be disposed on the reflective layer 13 (FIG. 1) or on the thin magnetic film 12 (in FIG. 2), or a dielectric layer for emphasizing the magneto-optic effect may be disposed between the non-magnetic support 11 and the thin magnetic film 12 in the embodiment in FIG. 1 or between the thin magnetic film 12 and the reflective layer 13 in the embodiment shown in FIG. 2.

As the non-magnetic support 11, optional non-magnetic material such as plastic film, ceramic, metal or glass may be used. As the plastic material for the nonmagnetic support 11, heat-resistant plastics such as polyimide, polyamide, polyether sulfone, etc., as well as plastics such as polyethylene terephthalate, polyvinyl chloride, cellulose triacetate, polycarbonate and polymethyl methacrylate may be exemplified. In addition, the support 11 may be in any of optional forms such as sheet, card, disk, drum and elongated tape.

The thin magnetic film 12 comprises magnetic nitride materials represented by the general formula: $M_xN$, wherein M represents at least one metal selected from Fe, Co and Ni and x is 2-3, and having a specific shape as described above.

The magnetic nitride material has a Curie point substantially determined depending on the value x. Further, depending on the value x, it takes various crystal structures for example, bcc, fcc, hcp, orth, etc. in the case of $Fe_xN$. Then, depending on the crystal structures, physical properties such as magnetic property, etc. are also varied. Among the crystal structures described above, fcc structure and hcp structure ($\epsilon$-phase) are useful and, particularly, the hcp structure ($\epsilon$-phase) is proferable for the recording media (such as magnetic recording media, magneto-optic recording media). Accordingly, $M_xN$ film in the present invention is a thin polycrystalline film of $\epsilon$-$M_xN$ in which the perpendicular magnetic film is oriented in the C-axis direction.

As has been mentioned previously, it has been considered that if thin magnetic $M_xN$ film is polycrystalline, different from thin amorphous magnetic film, grain boundaries are present, which cause noises upon permeation of light, thereby the light permeability is low (10-20%) and no large Faraday rotational angle ($\theta_F$) can be obtained. However, in the thin magnetic films according to the present invention, there is no substantial problem for such fear and it is possible to provide satisfactory repetitive stability for optical and thermal writing, and value for $\theta_F$ to which practical concerns are directed.

By the observation of the present inventors, it has been found that even if the grain is polycrystalline, the grain size is only about the order of several tens of Å (about 50 Å in $Fe_xN$), which gives little effect to the wavelength of light and great value for $\theta_F$ (about 0.7 deg/$\mu$m for $Fe_xN$) can be obtained, and accordingly a high S/N ratio can be attained.

Furthermore, it has also confirmed that if a nitrogen atom is incorporated in a great amount into an iron, the laser beam permeability is improved to as high as 40% (at wave length: $\lambda=800$ nm). In the case of optical and thermal recording (Curie point recording), the thin magnetic film has to absorb light to some extent and the absorbed light is converted to the heat.

Although that light permeability is improved with higher nitrogen content in the iron nitride, since the thin magnetic film has to be heated approximately to the Curie temperature (Tc) upon recording, higher sensitivity can be obtained with lower Tc value in this regard. However, the lower limit of Tc is about 50° C. since there is a trouble in maintaining the recording if Tc is lower than 50° C. If the x value in $Fe_xN$ is reduced nearly to 2, that is, a great amount of nitrogen is incorporated into Fe, the Curie point (Tc) is lowered. From a practical point of view, Tc is preferably within a range from 100° to 200° C. Tc is about 290° C. in the case of $Fe_3N$, which is the upper limit for the value x. In the case of thin magnetic nitride film, writing can be done also by utilizing the reduction in the coercive force by heating.

Conventional films formed from iron nitrides are referred to perpendicular magnetized films, but their perpendicular magnetic anisotropy is not always satisfactory. Those thin magnetic films having insufficient perpendicular magnetic anisotropy are not suitable to such high density recording as the bit diameter of below 1 $\mu$m and the magnetic field with perpendicular magnetic anisotropic ($H_A$) is as low as 1 KOe, and as a result the value $\theta_F$ can not be increased.

After all, the thin magnetic films according to the present invention have features in which (1) iron nitrides represented by the formula: $Fe_xN$ wherein x is 2-3 are used as the magnetic material, (2) Faraday rotational angle thereof is not less than 0.3 deg/$\mu$m, (3) they have the hcp structure (4) they are oriented along C-axis (crystals are deposited in the direction of C-axis) and (5) magnetic field with perpendicular magnetic anisotropy ($H_A$) thereof is not less than 4 KOe, preferably not less than 5 KOe (generally about from 6 to 7 KOe).

Such large values are obtained for the magnetic field with perpendicular magnetic anisotropy ($H_A$) and the Faraday rotational angle ($\theta_F$), because $Fe_4N$ or $\alpha$-Fe, etc. are not contained in the thin magnetic $Fe_xN$ films and the hexagonal $\epsilon$-phase $Fe_xN$ ($2 < x \leq 3$) is oriented along C-axis. It has been confirmed that the light permeability is improved and the squareness ratio is improved in $\theta_F$–H curve in accordance with the degree of orientation along C-axis. The degree of the C-axis orientation can be evaluated by using a half-value width ($\Delta\theta_{50}$) determined from a rocking curve in the plane C by X-ray diffractometry. According to the present invention, it has been confirmed that $\Delta\theta_{50}$ determined from the crystal phase (002) is not more than 1 degree and, if it exceeds 1 degree, the magnetic field with perpendicular anisotropy is reduced to less than 4 KOe and the light permeability and the Faraday rotational angle are insufficient. Then, as has been mentioned above, ion beam sputtering is particularly suitable for forming such thin magnetic films.

Iron nitrides constituting the thin magnetic film according to the present invention have the magnetic field with perpendicular magnetic anisotropy of not less than about 4 KOe, preferably not less than 5 KOe (usually about from 6 to 7 KOe or greater).

The magnetic thin film according to the present invention is not restricted only to those prepared from the above mentioned iron nitrides but in the formula: $M_xN$, M may be selected from the group consisting of Fe, Co and Ni or may be a combination of at least two selected from Fe, Co and Ni. It is, however, necessary also in this case that the above-mentioned restrictions have to be satisfied, i.e., x is 2-3, $\theta_F$ is not less than 0.3 deg/$\mu$m, it has hcp structure, it has C-axis orientation and magnetic field with perpendicular magnetic anisotropy ($H_A$) is not less than 4 KOe, preferably not less than 5 KOe.

The thickness of the thin magnetic film 12 is suitably from 0.05 to 0.5 $\mu$m, preferably from 0.05 to 0.2 $\mu$m. Since the perpendicular component in the magnetic nitride material is remarkably increased in the thin magnetic film 12 according to the present invention, large Faraday rotational angle can be obtained even in thin films.

As the material for the reflective layer 13, Au, Al, Ag, Pt, Cr, Nd, Ge, Rh, Cu, TiN, etc. are used, and the layer was prepared by means of various vapor deposition processes such as electron beam (EB) vapor deposition process. etc. or thin film forming method such as ion plating process. sputtering process, PVD process. CVD process. etc. The thickness of the reflective layer 13 is more than 1 μm, preferably about from 0.05 to 0.5 μm.

Further. as the material for the dielectric layer, $SiO_2$, $TiO_2$, silicon nitride, aluminum nitride, amorphous Si, may be exemplified. As the material for the lubricant layer, carbon, molybdenum dioxide, tungsten disulfide, α-olefin polymer, unsaturated hydrocarbons which are liquid at normal temperature (having 15 to 25 carbon atoms in which n-olefin double bonds are bonded to terminal carbon), fatty acid ester of monobasic fatty acid having 12 to 20 carbon atoms and monohydric alcohol having 3 to 12 carbon atoms.

Since the magnetic nitride material in the present invention can form satisfactory C-axis oriented films from the initial stage of the film formation without providing a primer layer, C-axis oriented films can be obtained with thickness even not greater than 0.1 μm, for example 0.05 μm and accordingly, perpendicular magnetization anisotropic films of satisfactory transparency can be obtained. It has been disclosed for the perpendicular magnetic recording media in Japanese Patent Application Laid-Open (KOKAI) No. 59-228705 that the perpendicular magnetization anisotropic film having the thickness of less than 0.1 μm can not be easily obtained. Accordingly, the portion for 0.1 μm thickness formed at the initial stage of the film formation is poor in the light permeability and perpendicular magnetic anisotropy, and it can not be said satisfactory for the magneto-optic recording media which are used while transmitting light throughout the films, which is distinctly different from the present invention. Accordingly, although the primer layer is not necessary, it may be provided in the magnetic nitride material according to the present invention. The thickness of the layer is suitably about from 0.05 to 0.5 μm.

The primer layer is disposed between the non-magnetic support 11 and the thin magnetic film 12 in the magneto-optic recording medium shown in FIG. 1, and between the dielectric layer and the thin magnetic film 12 in a case where such dielectric layer is disposed between the non-magnetic support 11 and the thin magnetic film 12. Further, it is disposed between the reflective layer 13 and the thin magnetic film 12 in the magneto-optic recording medium shown in FIG. 2.

The primer layer comprises a material selected from those non-magnetic materials having crystal face with the lattice constant is equal with or approximate to that of the thin magnetic nitride film 12 formed thereover. Accordingly, in the thin magnetic film 12 formed on the primer layer, perpendicular orientation film having the hcp structure is grown. Such primer layer is preferably constituted with the hcp structure, for example, of Ti, Zr and Mg.

In addition, for further improving the perpendicular magnetic anisotropy of the thin magnetic film 12, it is effective to add non-magnetic element, for example, B, Si and P by an amount of not greater than 20% by weight into the thin magnetic film to reduce the saturation magnetization Ms of the thin magnetic film 12, thereby further improving the perpendicular magnetic isotropy. In addition, for further improving the Faraday rotational angle ($\theta_F$) of the thin magnetic film 12, it is also effective to add paramagnetic ions such as $Eu^{2+}$, $Pr^{3+}$, $Tb^{3+}$, etc. to the thin magnetic film 12 and the primer layer described above.

As means for reducing the saturation magnetization and improving the perpendicular magnetic anisotropy of the thin magnetic film 12. it is effective to incorporate oxygen in the thin magnetic film in addition to the disposition of the primer layer.

Incorporation of oxygen into the thin magnetic film 12 is attained by mixing and coexistence of oxides of Co, Ni and/or Fe (magnetic oxide material) together with nitrides of Co, Ni and/or Fe. As preferred examples of magnetic oxide material of Co, Ni and/or Fe, FeO, $Fe_2O_3$, $Fe_3O_4$, CoO, $Co_2O_3$, $Co_3O_4$, NiO and $Ni_2O_3$ may be exemplified. All of the magnetic oxide materials are chemically and thermally stable as in the case of magnetic nitride materials. Magnetic materials of nitride-oxide mixture in which the magnetic oxide material and the magnetic nitride material are mixed and coexist can improve the light permeability if utilized as magneto-optic recording media.

The thin magnetic films of nitride-oxide mixture can be formed by irradiating ionized oxygen-containing nitrogen gases (argon is preferably added) to a target material, for example, made of pure iron, thereby sputtering Fe and forming oxygen-incorporated nitride films on a non-magnetic support.

The thin magnetic nitride-oxide films are preferably within the following range:
45 atomic % $\leq$ M $\leq$ 80 atomic %
10 atomic % $\leq$ N $\leq$ 30 atomic %
4 atomic % $\leq$ O $\leq$ 30 atomic %

Desired numeral values as described above can be obtained by controlling the ratio for the amount of ionized gases to about: $N_2$ = 10–80% by volume. Ar = 10–80% by volume and O = 2–15% by volume.

It is effective to incorporate fluorine into the thin magnetic film for reducing the saturation magnetization of the thin magnetic layer 12, lowering the Curie temperature (Tc) of the layer 12 and improving the permeability to laser light.

Incorporation of fluorine into the thin magnetic film 12 is attained by mixing and coexistence of fluorides of Co, Ni and/or Fe together with the nitrides of Co, Ni and/or Fe. Appropriate examples of fluorides of Co, Ni and/or Fe can include, for example, $FeF_2$, $FeF_3$, $Fe_2F_5$, $CoF_2$, $CoF_3$, $NiF_2$, etc.

In the magneto-optic recording media, if the Curie point (=Curie temperature: temperature at which magnetization is lost and writing is conducted) is too low, recording is lost during use. On the other hand, if it is too high, the laser beam output has to be increased. In the system of utilizing the Faraday effect among the magneto-optic effect greatly suffers from the effect of the thickness of thin magnetic film 12 and it is required that the film has an appropriate light permeability.

If the thin magnetic film 12 has an appropriate light permeability, it absorbs the laser beam to heat the film. If the permeability is poor, no large Faraday rotational angle can be obtained and high S/N ratio can not be obtained. Although the light permeability can be improved and the Curie temperature can be lowered if the nitrogen content in the magnetic nitride material ($M_xN$) is increased, nitrogen tends t be released from the films even by heating at low temperature to lack in stability if the nitrogen content is excessive.

In view of the above, if fluorine is incorporated into the thin magnetic nitride film ($M_xN$), it is possible to obtain an ideal magneto-optic recording medium having satisfactory perpendicular-magnetization film having both appropriate permeability and Curie temperature. It is considered that this is attributable to the mixing of fluoride (including also amorphous) of Fe. Co and Ni by an appropriate amount into $M_xN$ when it is formed as thin films, which can prevent the leaching of the nitrogen content in the films to provide chemical and physical stability. The thin magnetic film of nitride-fluoride mixture is preferably within the range:

43 atomic % $\leq M \leq$ 80 atomic %
10 atomic % $\leq N \leq$ 30 atomic %
4 atomic % $\leq F \leq$ 40 atomic %

The thin magnetic film of nitride-fluoride mixture may be formed by replacing "oxygen" in ionized gases with "fluorine" upon forming the thin magnetic film of nitride-oxide mixture as described above and by properly controlling the quantity ratio in the ionized gases.

Further, as another means for reducing the saturation magnetization and lowering the Curie temperature in order to improve the permeability of the thin magnetic film, it is also effective to incorporate carbon and oxygen into the magnetic nitride material ($M_xN$). In this case, the following range is appropriate.

50 atomic % $\leq M \leq$ 80 atomic %
10 atomic % $\leq N \leq$ 40 atomic %
2 atomic % $\leq C \leq$ 45 atomic %
2 atomic % $\leq O \leq$ 25 atomic %

Carbon can easily be incorporated into the film, as well as contributes to the improvement of the permeability. The situation is similar also for oxygen as has been described above. In addition, carbon and oxygen also produce an effect of not deteriorating the hcp structure and the orientation of crystals.

Carbon and oxygen may form crystals by bonding with Fe, Co and/or Ni upon film formation for the magnetic nitride material ($M_xN$) but it is preferred from an optical point of view that they are incorporated in an amorphous form into the film. Depending on the quantitative combination of carbon and oxygen, light permeability can be controlled within a wide range of from 20 to 60% by using laser beams at the wavelength of 500–900 nm in a case of a film thickness of from 1000 to 3000 Å.

The thin film of magnetic nitride material (magnetic material of nitride-carbide-oxide mixture) incorporated with carbon and oxygen may be formed by replacing "oxygen" in ionized gases upon forming the thin magnetic films of nitride-oxide mixture described above with "carbon oxide (CO)" and by appropriately controlling the quantitative ratio in the ionized gases. As has been often mentioned previously, since the Faraday rotational angles is in proportion with the permeation length of light through the thin magnetic film, the Faraday rotational angle is increased as the film thickness is increased.

By the way, in the media which use "Kerr effect" in the magneto-optic recording system light is reflected at the surface of thin magnetic film and the recording is read by the rotational angle (Kerr rotational angle) at that instance. In this case, amorphous rare earth-transition metal alloys (amorphous rare earth-transition metal alloys) have generally been used as the thin magnetic film.

It has been confirmed that the magneto-optic recording media utilizing both the Kerr effect and the Faraday effect of the thin magnetic film as described above are useful also upon forming films of $M_xN$ magnetic material.

Although magneto-optic recording media per se merely utilizing the Kerr effect and the Faraday effect together might be known so far, since amorphous rare earth-transition metal alloys is adverse to oxygen (because of being oxidized easily), it has a drawback that oxide magnetic materials (for example, Ba ferrite, Co ferrite, GdFe garnet, Bi substituted garnet, etc.) can not be laminated easily on the amorphous alloy layer.

In view of the above, in the present invention, it is also possible to form amorphous rare earth-transition metal alloy layer (amorphous alloy layer) instead of the reflective layer 13 in FIGS. 1 and 2. The reflectivity of the amorphous layer is about 50% (wavelength length $\lambda \approx 800$ nm) and it has a function as the reflective layer. Since it is preferable that the magnetic properties are similar between the amorphous rare earth-transition metal alloy layer and the thin magnetic film according to the present invention, those materials comprising GdCo, GdFe, TbFe, GdTbFe, TbDyFe, TbFeCo, etc. which contain Fe and Co as the main ingredient are used for the amorphous alloy layer.

In this magneto-optical recording media, although the composition may somewhat be mixed between the amorphous alloy layer and the thin magnetic film according to the present invention, this causes no disadvantage since the magnetic properties of the both layers are relatively similar to each other. It is of course possible to align the Curie temperature and the compensation temperature of the both layers. In a case where the amorphous alloy layer is situated at the free surface, it is preferable to dispose a protective layer (thin layer of AlN, SiN, SiO, TiO, TiN, $SiO_2$, etc.) thereover. Further, a dielectric layer may be disposed like that explained referring to FIGS. 1 and 2.

As has been described above, various film formation methods can be used for the production process of the magneto-optical recording media according to the present invention and, among all, ion beam sputtering method is effective for producing the thin magnetic film.

Figure 3:
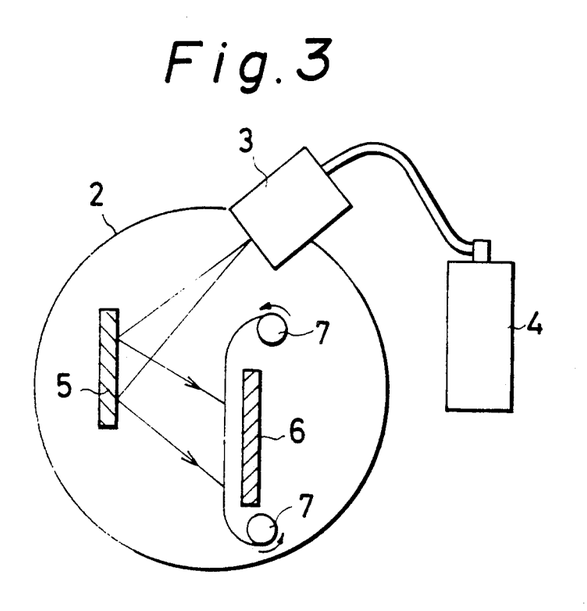
FIG. 3 is a schematic view illustrating the production process for the magneto-optic recording media according to the present invention.

FIG. 3 is a schematic view illustrating one embodiment of a preferred device for practicing the process according to the present invention.

In this device, an ion gun 3 is disposed with the top end of which being protruded to the inside of a vacuum vessel 2. The ion gun 3 is adapted to apply a DC voltage at several kV to $N_2$ gases supplied from a gas reservoir (preferably, gas mixture of $N_2$ gas and Ar gas), make them into the form of plasma and emit the plasma from the hole formed in the front surface at the top end toward a target 5.

Although the gas supplied from the gas reservoir 4 is $N_2$ gas or a gas mixture of $N_2$ gas and Ar gas in this embodiment, (a) oxygen gas may further be added to the supplied gases in a case where the thin magnetic nitride film contains, for example, oxygen (thin magnetic film of nitride-oxide mixture) and (b) CO gas or $CO_2$ gas may further be added in a case where the thin film contains oxygen and carbon (thin magnetic film of nitride-carbide-oxide mixture). Although the explanation is to be made assuming that the thin magnetic film is thin $Fe_xN$ film for the sake of the convenience, there is no substantial difference in the film forming means and metals or alloys used. When the target 5 is made of pure iron (about 99.99% purity), nitrogen atoms (preferably nitrogen atoms and argon atoms) made into plasma sputter the iron atoms of the target 5.

The sputtered iron atoms and the nitrogen atoms in the plasma in front of the target are brought into reaction to form $Fe_xN$ ($x=2-3$), and deposited to the surface of the non-magnetic support 11 to form a thin film (magnetic thin film).

In this way, the thin magnetic film 12 intended in the present invention can be formed on the non-magnetic support 11, in which the thin film is, preferably, formed by disposing the magnet 6 so as to form a magnetic field mainly composed of magnetic fluxes at the back of the non-magnetic support 11 and perpendicular to the surface of the non-magnetic support 11.

The non-magnetic support 11 is adapted to move by a rotational roll 7 that rotates slowly, but the non-magnetic support 11 is neither heated nor cooled and maintained at normal temperature.

It is preferred in any of the cases that Ar gas as an inert gas is present together with the gases supplied to the ion gun 3.

In a case where the non-magnetic support 11 is not flexible, a holder for the non-magnetic support 11 is used instead of using the rotational roll 7.

The magnet 6 may be an electromagnet or permanent magnet, and may be disposed in an optional number. It is only necessary that the magnet can form a magnetic field mainly composed of magnetic fluxes in perpendicular to the surface of the non-magnetic support 11. The strength of the magnetic field is set to from 10 to 5000 gauss, preferably, 100 to 1000 gauss.

The vacuum degree (gas pressure) in the vacuum vessel 2 is from $1\times10^{-5}$ to $10\times10^{-5}$ Torr, preferably from $1\times10^{-5}$ to $5\times10^{-5}$ Torr.

As "Test Example", in a case where film is formed by using the device as described above, composed of the target 5 of pure iron (99.99% purity) and under the conditions of setting the back pressure in the vacuum vessel 2 to about $2\times10^{-5}$ Torr, using a gas mixture of $N_2$ (75%) and Ar (25%) as the introduction gas, setting the ion gun voltage, to about 8.5 KV and the ion gun current to 5.5 mA, and setting each of the incident angle of the plasma irradiated from the ion gun 3 to the target 5 and to the non magnetic support (polyester film of about 25 μm thickness) to about 40 degree, Fe atoms and N atoms in the plasma are brought into reaction to form ε-phase $Fe_xN$ ($x=2-3$). The ε-phase $Fe_xN$ ($x=2-3$) is deposited while being oriented perpendicular to the surface of the non-magnetic support, that is, crystals are aligned in along the C-axis and thin film of ε-phase $Fe_xN$ ($x=2-3$) is formed on the non-magnetic support 11. Accordingly, the $Fe_xN$ thin film can be obtained as having extremely large perpendicular magnetic anisotropy. In fact, when the thin magnetic film was examined by means of X-ray diffractiometry, diffraction peaks for (002) (004) faces of the ε-phase $Fe_xN$ ($x=2-3$) having the hcp structure were observed and it was recognized that this was a single phase film (about 2000 Å of film thickness) in which (002) (004) faces were remarkably oriented. In addition, the half-value width ($\Delta\theta_{50}$) determined from a rocking curve in (002) face was 0.5 deg and it was an extremely satisfactory oriented films. Furthermore, the magnetic property examined by VSM was as shown in Table 1.

The incident angle of the plasma emitted from the ion gun 3 to the target 5 or the non-magnetic support 11 is preferably about 40 degree. However, it is not always limited but the angle may properly be selected, for example, in view of the moving speed of the non-magnetic support 11, thickness of the deposited film [thin film of ε-phase $Fe_xN$ ($x=2-3$)], etc.

The medium thus obtained by forming a thin magnetic iron nitride film on a non-magnetic support can be used effectively as high density magnetic recording medium.

A thin magnetic film is obtained by the same method as the above in a case of using Co, Ni, alloy of two or more metals of Fe, Co and Ni, or fluorides of these metals as the target 5.

Magnetic properties of a thin magnetic cobalt nitride film (of about 2000 Å thickness) and a thin magnetic nickel nitride film (of about 2000 Å thickness) formed under the same conditions as those in the film formation means for the thin magnetic iron nitride film are collectively shown in Table 1.

TABLE 1

| | Thin iron nitride film | Thin cobalt nitride film | Thin nickel nitride film |
|---|---|---|---|
| Hc ⊥ (Coersive force) | 360 Oe | 700 Oe | 320 Oe |
| Hc // (Coersive force) | 180 Oe | 350 Oe | 150 Oe |
| Ms (Saturation magnetization) | 91 emu/g | 70 emu/g | 31 emu/g |
| Sq ⊥ (Squareness ratio) | 0.32 | 0.29 | 0.24 |
| Sq // (Squareness ratio) | 0.08 | 0.16 | 0.12 |
| $H_A$ (Magnetic field with perpendicular magnetic anisotropy) | 6.2 KOe | 5.3 KOe | 5.5 KOe |
| $\theta_F$ (Faraday rotational angle)* | 0.74 deg/μm | 0.53 deg/μm | 0.49 deg/μm |
| Light Permeability ($\lambda$ = 780 nm) | 38% | 37% | 34% |

(Note)* Measured by using a semiconductor layer (wavelength at 780 nm at 210 mW), with A1 reflective layer of about 2000 Å disposed between each of thin nitride films and non-magnetic support.

The present invention is explained in more detail in the following Examples; however, it should be recognized that the scope of the present invention is not restricted to these Examples.

EXAMPLE 1

A thin Ti film (primer layer) of about 1000 Å thickness was formed as a primer layer on a glass substrate (Corning 7059) by using a vacuum vapor deposition device under the following conditions:
Evaporized material: Ti
Temperature of support: 300° C.
Back pressure in the vacuum vessel: $5\times10^{-5}$ Torr
Evaporization source—substrate gap: 25 cm When the obtained thin Ti film was examined by X-ray diffractiometry, a satisfactory C-axis oriented film was formed.

A magneto-optic recording medium was prepared by forming a thin iron nitride film (iron magnetic nitride layer) on the thin Ti film by using an ion beam sputtering device shown in FIG. 3 and under the same conditions as those for the formation of the thin iron nitride film as described above, except for using $N_2$ (100%) gas instead of a gas mixture of $N_2$ (75%) and Ar (25%) and setting the ion gun voltage to about 6 KV and the ion gun current to about 6 mA.

When the Faraday rotational angle ($\theta_F$) was measured by using a semiconductor laser (wavelength at 780 nm, power at 20 mW) while applying a magnetic field of 12 KOe at the maximum to the magneto-optic recording medium, the value $\theta_F$ was 0.86 deg/$\mu$m. The measured value $\theta_F$ showed no change even six months after the film formation.

In the formation of the thin iron nitride film, since only the $N_2$ gas was supplied on the target, reacted with Fe (also in the case of Co or Ni) to form a nitride. Use of a gas mixture of $N_2$ gas (10-90% by volume) and Ar gas (90-10% by volume) is advantageous, because a nitride film having the perpendicular magnetic anisotropy can be obtained more easily by using the inert gas (Ar gas).

EXAMPLE 2

A thin iron nitride film (thin magnetic film) was formed on a glass substrate under the same procedures as those in the preparation of the thin iron nitride films, by using the ion beam sputtering device shown in FIG. 3 except for using a gas mixture of $N_2$ and Ar (1:1 by volume ratio) and setting the ion gun voltage to about 9 KV and the ion gun current to about 2 mA and the ion incident angle to 45 degree. Then, an Al deposition layer (reflective layer) of about 1000 Å thickness was further disposed on the magnetic layer, to prepare a magneto-optic recording medium.

EXAMPLE 3

A magneto-optic recording medium was prepared by forming a thin cobalt nitride film quite in the same procedures as those in Example 2 except for replacing pure iron with pure cobalt (99.99% purity) as the material for the target.

The properties of these magneto-optical recording media are collectively shown in Table 2. When the thin iron nitride film and the thin cobalt nitride film in these magneto-optic recording media were immersed in an aqueous 5% NaCl solution for 200 hours, no changes were recognized in their properties.

COMPARATIVE EXAMPLE 1

Gaseous molecules containing iron atoms and gaseous molecules containing nitrogen atoms were introduced into a reaction vessel under a reduced pressure, and electromagnetic waves were applied to these gases to take place plasma reaction and form a thin iron nitride film on a glass substrate. When the thin iron nitride film was examined by thin film X-ray diffractiometry, diffraction peaks were observed for $Fe_4N$ (111), $Fe_3N$ (101) and $\alpha$-Fe (110), in addition to $Fe_3N$ (002).

The thin film showed insufficient orientation and it is considered to be a nitride mixture comprising iron and various crystal forms.

Magneto-optic recording media were prepared by disposing an Al deposition layer of about 1000 Å thickness on each of the thin iron nitride films described above. Properties of them are collectively shown in Table 2.

TABLE 2

|  | Example 2 | Example 3 | Comparative Example |
|---|---|---|---|
| $H_A$ (Magnetic field with perpendicular magnetic anisotriopy) | 6.5 KOe | 5.4 KOe | 1.2 KOe |
| $\theta_F$ (Faraday rotational angle) | 0.75 deg/$\mu$m | 0.55 deg/$\mu$m | 0.13 deg/$\mu$m |
| Light permeability ($\lambda$ = 780 nm) | 40% | 36% | 11% |

EXAMPLES 4-8

Magneto-optic recording media were prepared in the same manner as in the Test Example described above except for replacing the non-magnetic support with a glass plate, changing the ion incident angle to 45 degree and under the conditions as shown in Table 3.

TABLE 3

|  | Target (purity %) | Back pressure in vacuum vessel (Torr) | Ionized gas | Ion gun voltage (KV) | Ion gun current (mA) |
|---|---|---|---|---|---|
| Example 4 | Fe(99.99%) | $5 \times 10^{-6}$ | $N_2$(72%) + Ar(25%) − $O_2$(3%) | 8.5 | 2.5 |
| Example 5 | Co(99.99%) | $5 \times 10^{-6}$ | $N_2$(72%) − Ar(25%) − $O_2$(3%) | 8.5 | 2.5 |
| Example 6 | FeCo alloy (Fe:50 atomic %) | $5 \times 10^{-6}$ | $N_2$(72%) + Ar(25%) + $O_2$(3%) | 8.5 | 2.5 |
| Example 7 | $FeF_3$ | $5 \times 10^{-6}$ | $N_2$(50%) + Ar(50%) | 8 | 3 |
| Example 8 | Co(99.99%) | $2 \times 10^{-6}$ | $N_2$(55%) + Ar(25%) + CO(20%) | 8 | 4 |

For these magneto-optic recording media when the thin magnetic film of Example 4 was examined, by X-ray diffractiometry, intense diffraction peaks of C-face (002) (004) of $\epsilon$-phase iron nitride having the hcp structure were observed. The iron oxide content examined by using XPS (X-ray photoelectron spectroscopy) was 4% by weight. Results of VSM-measurement for magnetic property are collectively shown in Table 4.

When the thin magnetic film (thin magnetic film of cobalt nitride-iron oxide mixture) in Example 5 was examined by X-ray diffractiometry, C-axis oriented film of ε-phase Co nitride having the hcp structure was observed. The oxygen content examined by XPS was about 9 atomic %. The results of VSM-measurement for magnetic property are collectively shown in Table 4.

When the thin magnetic film (thin magnetic film of iron nitride-cobalt nitride-iron oxide mixture) in Example 6 was examined by X-ray diffractiometry, diffraction peaks at (002) (004) for ε-phase iron nitride and ε-phase cobalt nitride having the hcp structure were observed. However, the diffraction peaks showed not so great intensity and it is considered that the amorphous ingredient of iron nitride and cobalt nitride were contained. In addition, extremely small $Fe_2O_3$ diffraction peak was observed. The oxygen content examined by XPS was about 13 atomic %. The results of VSM-measurement for magnetic property are collectively shown in Table 4.

When the magnetic thin film of Example 7 was examined by X-ray diffractiometry, diffraction peak for ε-phase iron nitride having the hcp structure was observed and a C-axis oriented film was recognized. Further, minute diffraction peak for $FeF_2$ was observed. The F content examined by XPS was about 16 atomic %. The results of VSM-measurement for magnetic property are collectively shown in Table 4.

When the magnetic thin film of Example 8 was examined by X-ray diffractiometry, ε-phase cobalt nitride having the hcp structure was observed and a C-axis oriented film was recognized. The results of XPS measurement were as below:
Co: 62.5 atomic %
N: 13.5 atomic %
O: 11.7 atomic %
C: 12.5 atomic %

The results of VSM-measurement for magnetic property are collectively shown in Table 4.

procedures as in the Test Example, except for using a gas mixture of $N_2$ and Ar (1:1 by volume ratio) as the ionized gases, setting the ion gun voltage to 8 KV, the ion gun current to 2.5 mA and the ion incident angle to 45 degree. It was recognized that the thin magnetic film was ε-phase iron nitride having the hcp structure and oriented along C-axis.

When the magneto-optic effect was measured by a semiconductor laser beam (780 nm wavelength) while applying the magnetic field of 12 KOe at the maximum to the magneto-optic recording medium, it was 1.4 degree and the value showed no change even upon measurement after six months.

Many widely different embodiments of the present invention may be constructed without departing from the spirit and the scope of the present invention. It should be understood that the present invention is not limited to the specific embodiments described in the specification, except as defined in the appended claims.

What is claimed is:

1. Magneto-optic recording media, comprising a thin magnetic film oriented along C-axis comprising nitrides represented by $Fe_xN$ wherein x is 2-3, said nitrides being present in an amount sufficient to result in the following properties: a Faraday rotational angle of not less than 0.3 deg/μm and a magnetic field with perpendicular magnetic anisotropy of not less than 5 KOe, a reflective layer and a non-magnetic support, said thin magnetic film being formed directly or indirectly by way of the reflective layer on the non-magnetic support, providing that said reflective layer is formed on the thin magnetic layer when said thin magnetic layer is directly disposed on the non-magnetic support.

2. Magneto-optic recording media, comprising a thin magnetic film oriented along C-axis comprising nitrides represented by $M_xN$ wherein M represents at least one metal selected from the group consisting of Fe, Co and Ni and x is 2-3 said nitrides being present in an amount sufficient to result in the following properties: a Faraday rotational angle of not less than 0.3 deg/μm and a

TABLE 4

| | Example 4 | Example 5 | Example 6 | Example 7 | Example 8 |
|---|---|---|---|---|---|
| $H_A$ (Magnetic field with perpendicular magnetic anisotropy) | 7.3 KOe | 6.7 KOe | 5.3 KOe | 5.9 KOe | 6.8 KOe |
| $\theta_F$ (Faraday rotational angle) | 0.69 deg/μm | 0.51 deg/μm | 1.10 deg/μm | 0.87 deg/μm | 0.48 deg/μm |
| Light permeability (λ = 780 nm) | 46% | 42% | 39% | 49% | 45% |

EXAMPLE 9

An amorphous alloy layer (TbFeCo film) was formed on a glass substrate 11 by RF sputtering method under the conditions of the total gas pressure at 3 mTorr, charged electric power of 1 KW, substrate-target distance of 60 mm, deposition rate of 1000 Å/min and the composition of the target as $Tb_{20}(Fe_{0.9}Co_{0.1})$. The substrate was cooled with water.

Magneto-optic recording medium was prepared by forming a thin magnetic film (thin iron nitride film) of about 2000 Å on the amorphous alloy layer in the same magnetic field with perpendicular magnetic anisotropy of not less than 4 KOe, a reflective layer and a non-magnetic support, said thin magnetic film being formed directly or indirectly by way of the reflective layer on the non-magnetic support, providing that said reflective layer is formed on the thin magnetic layer when said thin magnetic layer is directly disposed on the non-magnetic support.

3. Magneto-optic recording media according to claim 2, wherein the thin magnetic film contains of at least one amorphous metal selected from the group consisting of Fe, Co and Ni.

4. Magneto-optic recording media according to claim 1, wherein the thin magnetic film contains of at least one amorphous metal selected from the group consisting of Fe, Co and Ni.

5. Magneto-optic recording media comprising a thin magnetic film oriented along C-axis comprising nitrides represented by $M_xN$ wherein M represents at least one metal selected from the group consisting of Fe, Co and Ni and x is 2-3 said nitrides being present in an amount sufficient to result in the following properties: a Faraday rotational angle of not less than 0.3 deg/$\mu$m and a magnetic field with perpendicular magnetic anisotropy of not less than 4 KOe, a thin amorphous film of rare earth-transition element alloy, a reflective layer and a non-magnetic support, said thin magnetic film being formed directly or indirectly by way of the reflective layer on the non-magnetic support, and said thin amorphous film of rare earth-transition element alloy being disposed between the thin magnetic film and the non-magnetic support.

6. Magneto-optic recording media according to claim 5, wherein the thin magnetic film contains of at least one amorphous metal selected from the group consisting of Fe, Co and Ni.

7. Magneto-optic recording media comprising a thin magnetic film oriented along C-axis comprising nitrides represented by $Fe_xN$ wherein x is 2-3, said nitrides being present in an amount sufficient to result in the following properties: a Faraday rotational angle of not less than 0.3 deg/$\mu$m and a magnetic field with perpendicular magnetic anisotropy of not less than 5 KOe, a thin amorphous film of rare earth-transition element alloy, a reflective layer and a non-magnetic support, said thin magnetic film being formed directly or indirectly by way of the reflective layer on the non-magnetic support, and said thin amorphous film of rare earth-transition element alloy being disposed between the thin magnetic film and the non-magnetic support.

8. Magneto-optic recording media according to claim 7, wherein the thin magnetic film contains of at least one amorphous metal selected from the group consisting of Fe, Co and Ni.

* * * * *